United States Patent
Gibbons et al.

(10) Patent No.: US 9,981,327 B2
(45) Date of Patent: *May 29, 2018

(54) CUTTING ANGLE INDICATOR IN JIGSAW HOUSING WITH DUST EXTRACTION

(75) Inventors: Louis A. Gibbons, Stevensville, MD (US); Weston J. Van Wambeke, Towson, MD (US); Ruth M. Keffer, Baltimore, MD (US); Michael F. Cannaliato, Bel Air, MD (US); Brent A. Kuehne, Red Lion, PA (US)

(73) Assignee: BLACK & DECKER INC., New Britain, CT (US)

( * ) Notice: Subject to any disclaimer, the term of this patent is extended or adjusted under 35 U.S.C. 154(b) by 1631 days.

This patent is subject to a terminal disclaimer.

(21) Appl. No.: 11/859,139

(22) Filed: Sep. 21, 2007

(65) Prior Publication Data

US 2009/0077814 A1    Mar. 26, 2009

(51) Int. Cl.
   *B23D 49/16*      (2006.01)
   *B23D 59/00*      (2006.01)
   *B27B 9/02*       (2006.01)

(52) U.S. Cl.
   CPC ......... *B23D 49/167* (2013.01); *B23D 59/002* (2013.01); *B23D 59/006* (2013.01); *B27B 9/02* (2013.01)

(58) Field of Classification Search
   CPC ...... B23D 45/16; B23D 49/167; B23D 53/12; B23D 59/002; B23D 59/006; B27B 9/02
   USPC ................. 30/376, 392–394; 83/522.18, 781
   See application file for complete search history.

(56) References Cited

U.S. PATENT DOCUMENTS

| | | | |
|---|---|---|---|
| 1,102,018 A | | 6/1914 | Dodds |
| 2,010,882 A | * | 8/1935 | Ocensek .......................... 33/500 |
| 2,377,673 A | | 6/1945 | Chaddock |
| 2,543,486 A | * | 2/1951 | Briskin ........................... 30/376 |
| 2,623,557 A | | 12/1952 | Kendall |
| 2,749,951 A | | 6/1956 | Tetzner |
| 2,775,272 A | | 12/1956 | Papworth |
| 2,819,742 A | | 1/1958 | Blachly |
| 2,916,062 A | | 12/1959 | Clauson |
| 2,934,106 A | | 4/1960 | Chapman et al. |
| 3,087,519 A | | 4/1963 | McCarty et al. |
| 3,093,773 A | | 6/1963 | Cole |
| 3,109,465 A | | 11/1963 | Smith |
| 3,116,768 A | | 1/1964 | Lasar |

(Continued)

FOREIGN PATENT DOCUMENTS

| | | |
|---|---|---|
| DE | 716 266 | 1/1942 |
| DE | 1 760 076 | 1/1958 |

(Continued)

OTHER PUBLICATIONS

Parts List for DW933 Type 1. Copyright © 2005.
Extended European Search Report for European Patent Application No. 08164643.2 dated Mar. 10, 2011 (7 pages).

*Primary Examiner* — Clark F Dexter
(74) *Attorney, Agent, or Firm* — Stephen R. Valancius

(57) ABSTRACT

A jigsaw generally includes a housing containing a motor activated by a trigger assembly. The housing defines a window. A shoe member pivotally connects to the housing. An indicator wheel is disposed in the housing so that a portion of the indicator wheel is visible through the window, wherein pivoting of the shoe member relative to the housing causes the indicator wheel to rotate.

30 Claims, 13 Drawing Sheets

(56) References Cited

U.S. PATENT DOCUMENTS

| | | | |
|---|---|---|---|
| 3,131,736 A | 5/1964 | Ristow et al. | |
| 3,146,809 A | 9/1964 | Botefuhr | |
| 3,353,573 A | 11/1967 | Hitzeroth | |
| 3,374,814 A | 3/1968 | Kaufmann | |
| 3,388,728 A | 6/1968 | Riley, Jr. et al. | |
| 3,456,698 A | 7/1969 | Csaki | |
| 3,457,796 A | 7/1969 | Leach et al. | |
| 3,461,732 A | 8/1969 | Gregory | |
| 3,478,786 A | 11/1969 | Hendrickson | |
| 3,542,097 A | 11/1970 | Dudek et al. | |
| 3,805,383 A | 4/1974 | McNally | |
| 3,834,019 A | 9/1974 | Smeltzer et al. | |
| 3,938,251 A | 2/1976 | Kareman | |
| 3,969,796 A | 7/1976 | Hodsdon et al. | |
| 3,973,324 A | 8/1976 | Persson | |
| 4,090,297 A | 5/1978 | Wanner et al. | |
| 4,137,632 A | 2/1979 | Pfanzer | |
| 4,191,917 A | 3/1980 | Brown et al. | |
| 4,213,242 A | 7/1980 | Partington | |
| 4,238,884 A | 12/1980 | Walton, II | |
| 4,240,204 A | 12/1980 | Walton, II et al. | |
| 4,250,624 A | 2/1981 | Partington | |
| 4,255,006 A | 3/1981 | King | |
| 4,255,858 A | 3/1981 | Getts | |
| 4,257,297 A | 3/1981 | Nidbella | |
| 4,262,421 A | 4/1981 | Bergler et al. | |
| 4,272,889 A | 6/1981 | Scott et al. | |
| 4,283,855 A | 8/1981 | Nalley | |
| 4,351,112 A | 9/1982 | Nalley | |
| 4,377,003 A | 3/1983 | Abe et al. | |
| 4,514,909 A * | 5/1985 | Gilbert | 33/471 |
| 4,545,123 A | 10/1985 | Hartmann | |
| 4,614,037 A | 9/1986 | Somers | |
| 4,628,459 A | 12/1986 | Shinohara et al. | |
| 4,628,605 A | 12/1986 | Clowers | |
| 4,636,961 A | 1/1987 | Bauer | |
| 4,665,617 A | 5/1987 | Maier et al. | |
| 4,675,999 A | 6/1987 | Ito et al. | |
| 4,693,009 A | 9/1987 | Bone | |
| 4,730,397 A | 3/1988 | Weiford et al. | |
| 4,833,782 A | 5/1989 | Smith | |
| 4,837,935 A | 6/1989 | Maier et al. | |
| 4,932,294 A | 6/1990 | Chang | |
| 4,962,681 A | 10/1990 | Yang | |
| 4,969,830 A | 11/1990 | Daly et al. | |
| 4,973,205 A | 11/1990 | Spaulding | |
| 5,010,652 A | 4/1991 | Miletich | |
| 5,012,583 A | 5/1991 | Blochle et al. | |
| 5,038,481 A | 8/1991 | Smith | |
| 5,119,705 A | 6/1992 | Rosenberger et al. | |
| 5,205,043 A | 4/1993 | Batt et al. | |
| 5,208,525 A | 5/1993 | Lopic et al. | |
| 5,273,462 A | 12/1993 | Huser et al. | |
| 5,279,037 A | 1/1994 | Leatherman | |
| 5,445,479 A | 8/1995 | Hillinger | |
| 5,535,437 A | 7/1996 | Karl et al. | |
| 5,549,145 A | 8/1996 | Bearden | |
| 5,617,638 A | 4/1997 | Amano et al. | |
| 5,644,845 A | 7/1997 | Durr et al. | |
| 5,644,846 A | 7/1997 | Durr et al. | |
| 5,644,847 A | 7/1997 | Odendahl et al. | |
| 5,675,899 A | 10/1997 | Webb | |
| 5,680,704 A | 10/1997 | Okubo et al. | |
| 5,716,730 A | 2/1998 | Deguchi | |
| 5,727,322 A | 3/1998 | Giacometti | |
| 5,778,538 A | 7/1998 | Gentinetta et al. | |
| 5,784,800 A | 7/1998 | Santhouse et al. | |
| 5,813,805 A | 9/1998 | Kopras | |
| D404,274 S | 1/1999 | Ogasawara et al. | |
| 5,902,080 A | 5/1999 | Kopras | |
| 5,996,460 A | 12/1999 | Waite | |
| 6,017,242 A | 1/2000 | Kerrigan | |
| 6,021,826 A | 2/2000 | Daniell | |
| 6,157,545 A | 12/2000 | Janninck et al. | |
| 6,178,646 B1 | 1/2001 | Schnell et al. | |
| 6,189,217 B1 | 2/2001 | Melvin et al. | |
| D440,474 S | 4/2001 | Heun | |
| 6,220,888 B1 | 4/2001 | Correa | |
| 6,230,411 B1 | 5/2001 | Wall et al. | |
| D446,703 S | 8/2001 | Netzler | |
| 6,305,089 B1 | 10/2001 | Berndt | |
| 6,334,743 B1 | 1/2002 | Liao | |
| 6,353,705 B1 * | 3/2002 | Capps et al. | 388/830 |
| 6,357,123 B1 | 3/2002 | Manuel | |
| 6,357,124 B1 | 3/2002 | Wall et al. | |
| 6,397,717 B1 | 6/2002 | Waite | |
| 6,412,181 B1 | 7/2002 | Pracas | |
| 6,443,675 B1 | 9/2002 | Kopras et al. | |
| 6,449,851 B1 | 9/2002 | Bone et al. | |
| D463,963 S | 10/2002 | Metaxatos et al. | |
| 6,484,409 B2 | 11/2002 | Campbell et al. | |
| 6,510,772 B2 | 1/2003 | Brickner, Jr. et al. | |
| 6,553,642 B2 | 4/2003 | Driessen | |
| 6,553,675 B2 | 4/2003 | Orrico | |
| D474,384 S | 5/2003 | Andriolo | |
| D476,871 S | 7/2003 | Santarsiero et al. | |
| 6,625,892 B2 | 9/2003 | Takahashi et al. | |
| D486,711 S | 2/2004 | Tam et al. | |
| 6,691,417 B2 | 2/2004 | Campbell et al. | |
| 6,705,017 B2 | 3/2004 | Ellis et al. | |
| D489,239 S | 5/2004 | Keller | |
| 6,755,107 B2 | 6/2004 | Peot et al. | |
| 6,769,188 B2 | 8/2004 | Dorner et al. | |
| 6,877,234 B2 | 4/2005 | Saegesser et al. | |
| 6,890,135 B2 | 5/2005 | Kopras et al. | |
| 6,892,459 B2 | 5/2005 | Okumura et al. | |
| 6,902,356 B2 | 6/2005 | Breitenmoser | |
| 6,912,788 B2 | 7/2005 | Tam et al. | |
| 6,920,694 B2 | 7/2005 | Hecht et al. | |
| 7,003,887 B2 * | 2/2006 | Wadge | B23D 49/167 144/154.5 |
| D519,014 S | 4/2006 | Aglassinger | |
| D519,346 S | 4/2006 | Wu | |
| D519,804 S | 5/2006 | Wu | |
| D519,805 S | 5/2006 | Ng | |
| D519,806 S | 5/2006 | Waldron | |
| D520,318 S | 5/2006 | Waldron | |
| D521,335 S | 5/2006 | Parel et al. | |
| D521,834 S | 5/2006 | Andriolo et al. | |
| D522,335 S | 6/2006 | Houghton | |
| D523,309 S | 6/2006 | Schmid | |
| D523,311 S | 6/2006 | Welsh et al. | |
| 7,065,884 B2 | 6/2006 | Tam et al. | |
| D524,621 S | 7/2006 | Wu | |
| D524,622 S | 7/2006 | Corcoran | |
| D525,098 S | 7/2006 | Taniguchi et al. | |
| 7,094,011 B2 | 8/2006 | Kopras et al. | |
| 7,111,405 B2 | 9/2006 | Delfini et al. | |
| D532,664 S | 11/2006 | Wu | |
| 7,131,180 B2 | 11/2006 | Kopras et al. | |
| 7,131,206 B2 | 11/2006 | Wu | |
| 7,152,329 B2 | 12/2006 | Kondo et al. | |
| 7,234,243 B2 | 6/2007 | Tam et al. | |
| D560,455 S | 1/2008 | Yamamoto et al. | |
| 7,328,514 B2 | 2/2008 | Park | |
| D566,504 S | 4/2008 | Hayakawa et al. | |
| D572,555 S | 7/2008 | Baumgaertner | |
| 7,497,017 B2 | 3/2009 | Bone et al. | |
| 7,503,121 B2 | 3/2009 | Powell et al. | |
| 7,509,744 B2 | 3/2009 | Walker | |
| 7,513,047 B2 | 4/2009 | Wu | |
| 7,526,867 B2 | 5/2009 | Park | |
| 7,562,457 B2 | 7/2009 | Prieto | |
| 2002/0131267 A1 | 9/2002 | Van Osenbruggen | |
| 2002/0134811 A1 * | 9/2002 | Napier et al. | 227/131 |
| 2002/0197123 A1 | 12/2002 | Kopras et al. | |
| 2003/0000355 A1 | 1/2003 | Butler et al. | |
| 2003/0110646 A1 | 6/2003 | Phillips et al. | |
| 2003/0121389 A1 | 7/2003 | Wheeler et al. | |
| 2003/0145472 A1 | 8/2003 | Swift | |
| 2003/0167641 A1 | 9/2003 | Teng | |
| 2003/0196338 A1 | 10/2003 | Eto et al. | |
| 2003/0233921 A1 | 12/2003 | Garcia et al. | |
| 2004/0040161 A1 | 3/2004 | Houben et al. | |

(56) References Cited

U.S. PATENT DOCUMENTS

| | | |
|---|---|---|
| 2004/0049927 A1 | 3/2004 | Wu |
| 2004/0112187 A1 | 6/2004 | Chen et al. |
| 2004/0128843 A1 | 7/2004 | Walker |
| 2004/0168561 A1 | 9/2004 | Tam et al. |
| 2004/0261274 A1 | 12/2004 | Tam et al. |
| 2005/0060896 A1 | 3/2005 | Park |
| 2005/0061123 A1 | 3/2005 | Park |
| 2005/0195592 A1 | 9/2005 | Hsu et al. |
| 2005/0198834 A1* | 9/2005 | Wadge ............... B23D 49/167 30/166.3 |
| 2005/0217448 A1 | 10/2005 | Walker |
| 2005/0223571 A1 | 10/2005 | Park et al. |
| 2005/0229408 A1 | 10/2005 | Ngan et al. |
| 2005/0252007 A1 | 11/2005 | Critelli et al. |
| 2005/0257383 A1 | 11/2005 | Million |
| 2005/0257384 A1 | 11/2005 | Million |
| 2005/0257385 A1 | 11/2005 | Walker |
| 2005/0262707 A1 | 12/2005 | Wu |
| 2005/0283984 A1 | 12/2005 | Walmsley |
| 2006/0064882 A1 | 3/2006 | Wilson et al. |
| 2006/0080850 A1 | 4/2006 | Firth |
| 2006/0090355 A1 | 5/2006 | Di Nicolantonio |
| 2006/0101969 A1 | 5/2006 | Garcia et al. |
| 2006/0104732 A1 | 5/2006 | Huang |
| 2006/0117580 A1 | 6/2006 | Serdynski et al. |
| 2006/0143928 A1 | 7/2006 | Wu |
| 2006/0168824 A1 | 8/2006 | Roberts |
| 2006/0185173 A1 | 8/2006 | Wadge et al. |
| 2006/0191140 A1 | 8/2006 | Wadge et al. |
| 2006/0196059 A1 | 9/2006 | Berto |
| 2006/0288592 A1 | 12/2006 | Roberts |
| 2007/0059114 A1 | 3/2007 | Grimes |
| 2007/0068012 A1 | 3/2007 | Chen |
| 2007/0101586 A1 | 5/2007 | Felder et al. |
| 2007/0180711 A1 | 8/2007 | Park |
| 2007/0186425 A1 | 8/2007 | Tam et al. |
| 2007/0214659 A1 | 9/2007 | Bone et al. |
| 2007/0289148 A1* | 12/2007 | Zhang et al. ............... 30/392 |
| 2008/0222901 A1 | 9/2008 | Kaiser et al. |
| 2008/0229589 A1 | 9/2008 | Bone |
| 2008/0244910 A1 | 10/2008 | Patel |
| 2009/0313831 A1 | 12/2009 | Patel |

FOREIGN PATENT DOCUMENTS

| | | |
|---|---|---|
| DE | 1 795 934 | 9/1959 |
| DE | 1 628 899 | 8/1971 |
| DE | 23 03 532 | 8/1974 |
| DE | 24 35 845 | 2/1976 |
| DE | 26 50 470 | 5/1978 |
| DE | 80 33 115 | 5/1981 |
| DE | 30 21 801 | 12/1981 |
| DE | 31 18758 | 12/1982 |
| DE | 32 22 426 | 12/1983 |
| DE | 3403762 A1 | 8/1985 |
| DE | 34 08 847 | 11/1985 |
| DE | 34 46 278 | 6/1986 |
| DE | 35 43 764 | 6/1986 |
| DE | 35 09 515 | 9/1986 |
| DE | 8507818 U1 | 2/1987 |
| DE | 36 08 301 | 9/1987 |
| DE | 88 08 046 U1 | 10/1988 |
| DE | 35 46 547 | 5/1989 |
| DE | 3906643 A1 | 9/1990 |
| DE | 35 46 700 | 10/1990 |
| DE | 39 21 891 | 1/1991 |
| DE | 40 27 135 | 3/1992 |
| DE | 93 07 337 | 8/1993 |
| DE | 9313712 U1 | 12/1993 |
| DE | 43 20 233 | 6/1994 |
| DE | 43 16 155 | 11/1994 |
| DE | 195 13 078 | 10/1996 |
| DE | 196 04 938 | 2/1997 |
| DE | 296 15 634 U | 4/1997 |
| DE | 196 09 388 | 9/1997 |
| DE | 29910173 U1 | 9/1999 |
| DE | 199 26 387 | 12/2000 |
| DE | 201 20 529 U | 4/2002 |
| DE | 102 15 871 | 10/2003 |
| DE | 202 20 893 U | 6/2004 |
| DE | 10 2004 042 025 | 3/2006 |
| DE | 102004043564 | 3/2006 |
| DE | 102004051350 | 4/2006 |
| DE | 20 2006 004 715 U | 6/2006 |
| DE | 102004 063174 | 7/2006 |
| DE | 102005025934 | 12/2006 |
| DE | 102006005410 A1 | 8/2007 |
| EP | 0 347 631 | 12/1989 |
| EP | 0 504 745 | 9/1992 |
| EP | 0 521 263 | 1/1993 |
| EP | 0 603 552 | 6/1994 |
| EP | 0 716 897 | 6/1996 |
| EP | 0 716 898 | 6/1996 |
| EP | 0 736 353 | 10/1996 |
| EP | 0 826 453 | 3/1998 |
| EP | 0 967 040 B1 | 12/1999 |
| EP | 0 970 771 | 1/2000 |
| EP | 1 188 505 | 3/2002 |
| EP | 1 328 369 | 4/2002 |
| EP | 1 258 305 | 11/2002 |
| EP | 1 001 866 B1 | 3/2004 |
| EP | 1 586 399 | 10/2005 |
| EP | 1 658 936 | 5/2006 |
| EP | 1 679 144 | 7/2006 |
| EP | 1 437 203 B1 | 12/2006 |
| EP | 1 595 631 B1 | 2/2007 |
| GB | 221671 A | 9/1924 |
| GB | 2075421 A | 11/1981 |
| GB | 2300145 A | 10/1996 |
| GB | 2 310 905 | 9/1997 |
| GB | 2 330 328 | 4/1999 |
| GB | 2 336 805 | 11/1999 |
| GB | 2 337 228 | 11/1999 |
| GB | 2 399 314 | 9/2004 |
| GB | 2 399 315 | 9/2004 |
| GB | 2 399 537 A | 9/2004 |
| GB | 2 406 071 | 3/2005 |
| GB | 2 414 708 A | 12/2005 |
| JP | 2000 343309 | 12/2000 |
| JP | 2002 337102 | 11/2002 |
| WO | WO 8605427 | 9/1986 |
| WO | WO-9902310 A2 | 1/1999 |
| WO | WO 02/22297 | 3/2002 |
| WO | WO-0232608 A1 | 4/2002 |
| WO | WO/02/057042 | 7/2002 |
| WO | WO 03/106087 | 12/2003 |

* cited by examiner

CUTTING ANGLE INDICATOR IN JIGSAW HOUSING WITH DUST EXTRACTION

FIELD

The present teachings relate to a cutting tool and more particularly relate to a cutting angle indicator visible through a window in the housing of a jigsaw having a positive lock for a shoe at a zero degree cutting angle and dust extraction through the housing.

BACKGROUND

Typically, a jigsaw can cut perpendicular to a plane of a workpiece. In some applications, however, the jigsaw can be pivoted to form a non-perpendicular cutting angle, e.g., a bevel cut at forty five degrees. Certain applications can require that the angle, at which the jigsaw is pivoted, be at a relatively accurate and specific angle. In this instance, additional tools can be used to confirm the angle between the housing and the workpiece or tick marks can be formed on the shoe and/or the housing and used to judge the angle based on the relative position of the tick marks.

SUMMARY

The present teachings generally include a jigsaw having a housing containing a motor activated by a trigger assembly. The housing defines a window. A shoe member is pivotally connected to the housing. An indicator wheel is disposed in the housing so that a portion of the indicator wheel is visible through the window, wherein pivoting of the shoe member relative to the housing causes the indicator wheel to rotate.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings.

DETAILED DESCRIPTION

Figure 1:
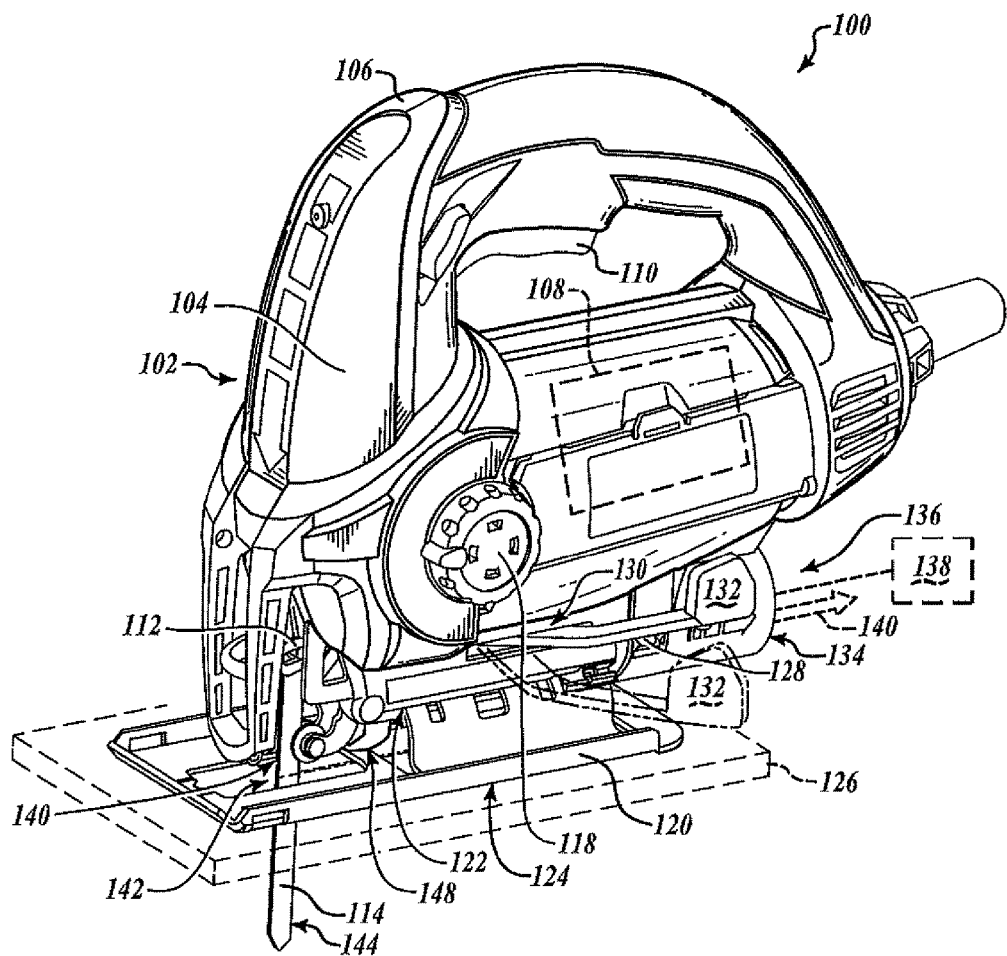
FIG. 1 is a perspective view of an example of a jigsaw having an angle indicator wheel visible through a window in the housing and a dust extraction airflow from a cutting area, through the housing and out of a vacuum port in accordance with the present teachings.

The following description is merely exemplary in nature and is not intended to limit the present teachings, their application or uses. It should be understood that throughout the drawings, corresponding reference numerals can indicate like or corresponding parts and features.

Moreover, certain terminology can be used for the purpose of reference only and do not limit the present teachings. For example, terms such as "upper," "lower," "above" and "below" can refer to directions in the drawings to which reference is made. Terms such as "front," "back," "rear" and "side" can describe the orientation of portions of the component, function, system, etc. within a consistent but arbitrary frame of reference which can be made more clear by reference to the text and the associated drawings describing the component, function, system, etc. under discussion. Such terminology may include the words specifically mentioned above, derivatives thereof and words of similar import. Similarly, the terms "first," "second" and other such numerical terms referring to structures, systems and/or methods do not imply a sequence or order unless clearly indicated by the context.

Figure 6:
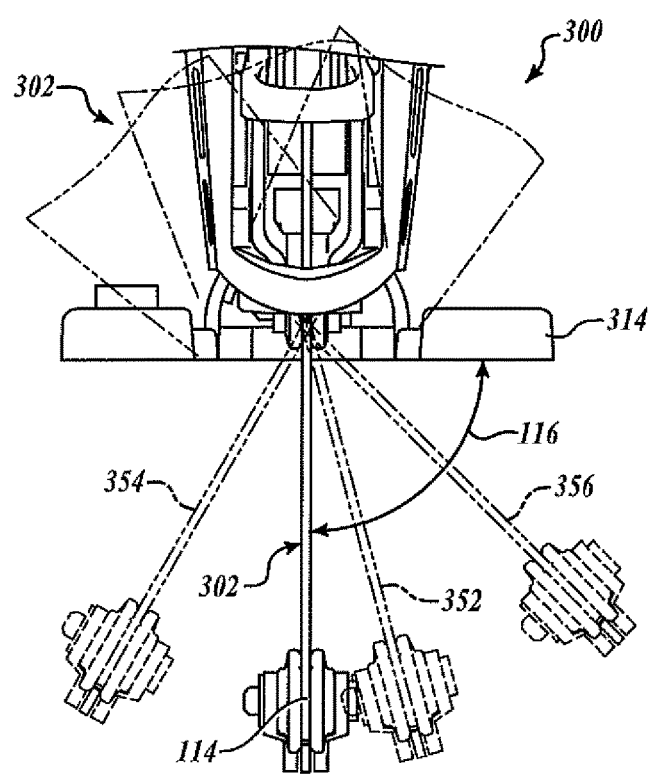
FIG. 6 is a partial front view of the jigsaw of FIG. 3 showing the cutting angle at one position selected from a range of positions in accordance with the present teachings.

With reference to FIG. 1, a jigsaw 100 generally includes a housing 102 that can be formed of two half shells 104, 106. The housing 102 can contain a motor 108. When activated by a trigger assembly 110, the motor 108 can provide a reciprocating and/or pendulum motion to a cutting blade holder 112 on an end of a reciprocating shaft to drive a cutting blade 114 at a cutting angle 116 (FIG. 6). A control member 118 on a side of the housing 102 can control a rate of reciprocation and/or a magnitude of a pendulum motion of the cutting blade 114.

A shoe member 120 can be coupled to a bottom 122 of the housing 102 in such a way as to permit the shoe member 120 to pivot relative to the housing 102. As the shoe member 120 pivots relative to the housing 102, the cutting blade 114 can be orientated at various angles (i.e., one or more of the cutting angles 116 (FIG. 6)) relative to the shoe member 120.

A bottom surface 124 of the shoe member 120 can abut a workpiece 126, which can be wood, plastic, metal, other suitable materials and one or more combinations thereof and can be in the form of pipe, sheet material, stock material, other suitable forms and/or materials and one or more combinations thereof. The shoe member 120 can be pivoted relative to the housing 102 to adjust the cutting angle 116 (FIG. 6) of the jigsaw 100, e.g., at a forty five degree cutting angle. As the shoe member 120 is moved relative to the housing 102, an angle indicator wheel 128 that can be rotatably coupled to the shoe member 120 (see, e.g., FIG. 9) can indicate the cutting angle 116 of the jigsaw 100.

Further, a locking mechanism 130 can include a bevel lever 132 that can be adjusted between an unlocked condition, as shown (in phantom) in FIG. 1 and a locked condition, as shown in FIG. 1. In the unlocked condition, the locking mechanism 130 can permit the shoe member 120 to pivot relative to the housing 102. In the locked condition, the locking mechanism 130 can prevent the shoe member 120 from pivoting relative to the housing 102. In this regard, the cutting angle 116 (FIG. 6) to which the shoe member 120 can be pivoted relative to the housing 102, when the locking mechanism 130 is in the unlocked condition, can be indicated by the angle indicator wheel 128.

A dust extraction port 134 can be formed on a rear portion 136 of the housing 102 such that a vacuum source 138 can be connected with various suitable connections to the dust extraction port 134. A dust extraction airflow 140 can be extracted from a cutting area 142. From the cutting area 142, the dust extraction airflow 140 can move into the housing 102 near a rear edge 144 of the cutting blade 114, through the housing 102 and out through the dust extraction port 134.

Figure 10:
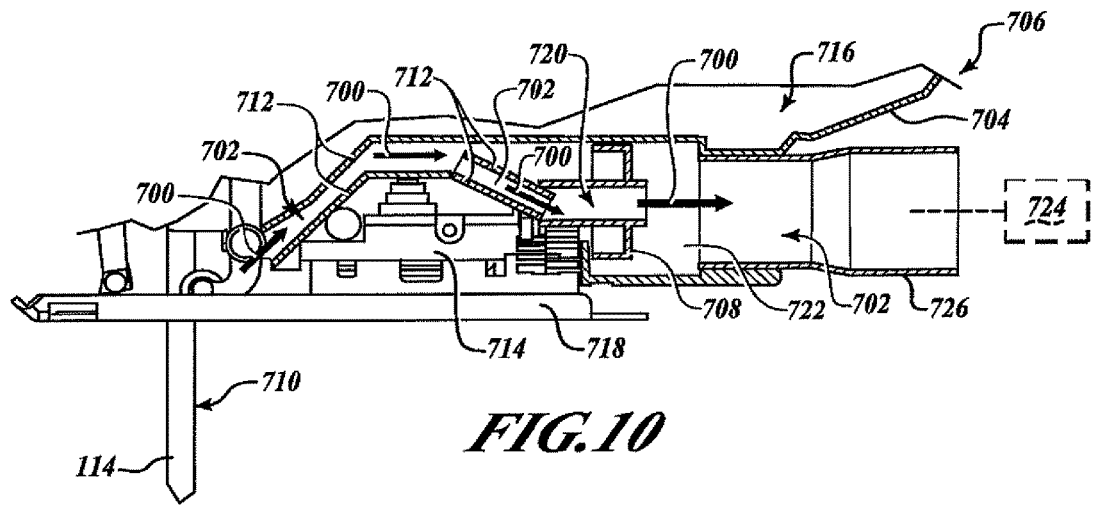
FIG. 10 is a simplified partial cross-sectional view of a housing of a jigsaw showing a dust extraction airflow from a cutting area up into an airflow pathway formed through the housing, through an inner periphery of the angle indicator wheel and exhausting through an exhaust port in a rear portion of the housing in accordance with the present teachings.
Figure 11:
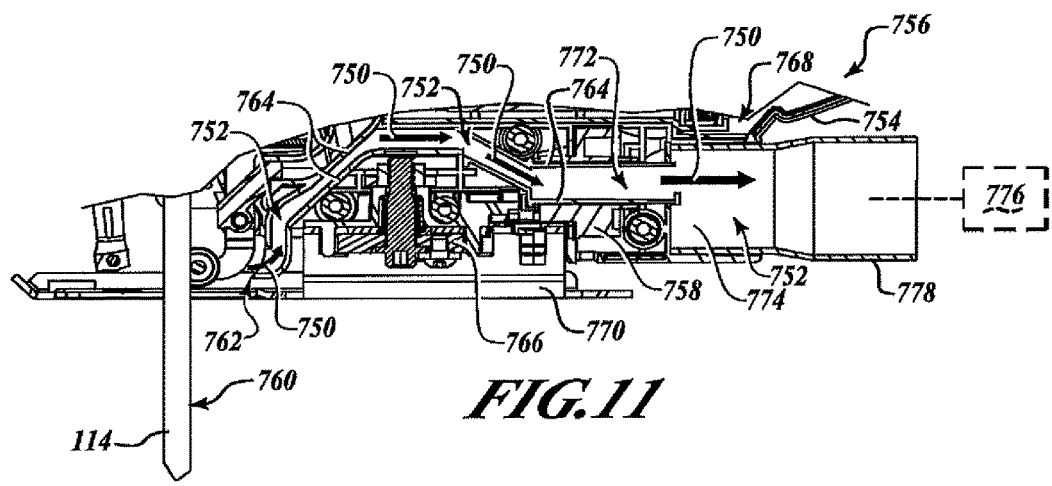
FIG. 11 is similar to FIG. 10 and shows a dust extraction airflow from the cutting area through a scoop member that leads into an airflow pathway formed through the housing, through an inner periphery of the angle indicator wheel and exhausting through the exhaust port in the rear portion of the housing in accordance with the present teachings.

The dust extraction airflow 140 can travel through the housing 102 and can be routed through an inner periphery of the angle indicator wheel 128. In one example, the angle indicator wheel 128 can be similar to an angle indicator wheel 708 having an inner periphery 720, as shown in FIG. 10. In another example, the angle indicator wheel 128 can be similar to an angle indicator wheel 758 having an inner periphery 772, as shown in FIG. 11.

Figure 12:
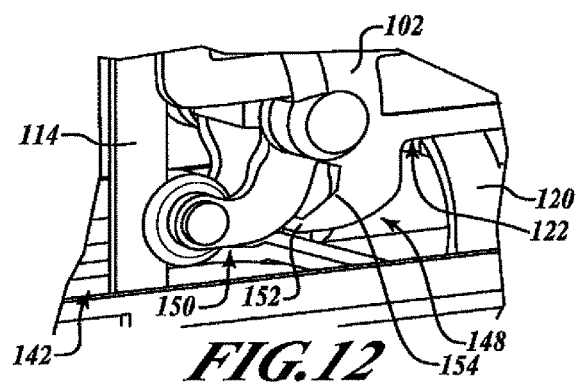
FIG. 12 is a partial perspective view of a scoop member formed on a jigsaw housing through which a dust extraction airflow departs from the cutting area into a pathway formed in the housing in accordance with the present teachings.

In a further example and with reference to FIGS. 1 and 12, the dust extraction airflow 140 can exit the cutting area 142 through a scoop member 148 that extends from the housing 102. The scoop member 148 can be similar to a scoop member 762, as shown in FIG. 11. In the above examples, the shoe member 120 can be pivoted relative to the housing 102 without interrupting the dust extraction airflow 140 through the housing 102 and through the angle indicator wheel 128.

Figure 2:
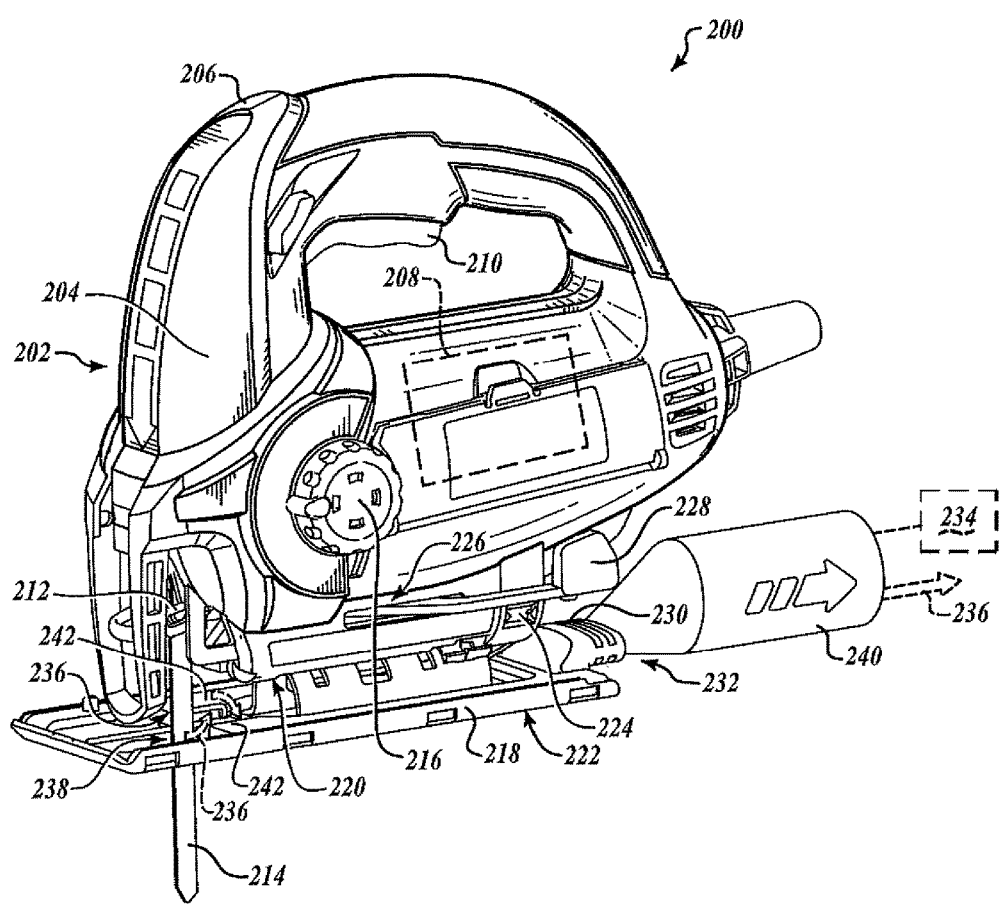
FIG. 2 is a perspective view of another example of a jigsaw having an angle indicator wheel visible through a window in the housing and a dust extraction airflow from a cutting area, through a shoe member and out of a vacuum port that extends from the shoe member in accordance with the present teachings.

With reference to FIG. 2, a jigsaw 200 includes a housing 202 that can be formed of two half shells 204, 206. The housing 202 can contain a motor 208. When activated by a trigger assembly 210, the motor 208 can provide a reciprocating and/or pendulum motion to a cutting blade holder 212 on and end of a reciprocating shaft to drive a cutting blade 214 at one or more of the cutting angles 116 (FIG. 6). A control member 216 on a side of the housing 202 can control the rate of reciprocation and/or the magnitude of the pendulum motion of the cutting blade 214.

A shoe member 218 can be coupled to a bottom 220 of the housing 202 in such a way as to permit the shoe member 218 to pivot relative to the housing 202. As the shoe member 218 pivots relative to the housing 202, the cutting blade 214 can be orientated at the various cutting angles 116 (FIG. 6) relative to the shoe member 218. A bottom surface 222 of the shoe member 218 can abut the workpiece 126 (FIG. 1).

As the shoe member 218 is moved relative to the housing 202, an angle indicator wheel 224 can be rotatably coupled to the shoe member 218 (see, e.g., FIG. 9), and can indicate the cutting angle 116 (FIG. 6) of the jigsaw 200. Further, a locking mechanism 226 can include a bevel lever 228 that can be adjusted between an unlocked condition (e.g., in phantom in FIG. 1) and a locked condition. The cutting angle 116 (FIG. 6) to which the shoe member 218 can be pivoted relative to the housing 202, when the locking mechanism 226 is in the unlocked condition, can be indicated by the angle indicator wheel 224.

A dust extraction port 230 can be formed on a rear portion 232 of the shoe member 218, in contrast to the dust extraction airflow 140 through the housing 102 (FIG. 1). A vacuum source 234 can be connected to the dust extraction port 230. A dust extraction airflow 236 can be extracted from a cutting area 238. From the cutting area 238, the dust extraction airflow 236 can move through the shoe member 218 and out through the dust extraction port 230 that extends therefrom. A vacuum source adapter 240 can be connected to the dust extraction port 230 formed in the shoe member 218 and can be used to connect to the vacuum source 234. Inlets 242 can be formed at one or more locations on the shoe member 218 adjacent the cutting area 238. From the inlets 242, the dust extraction airflow 236 can be routed through channels in the shoe member 218 to the dust extraction port 230.

Figure 3:
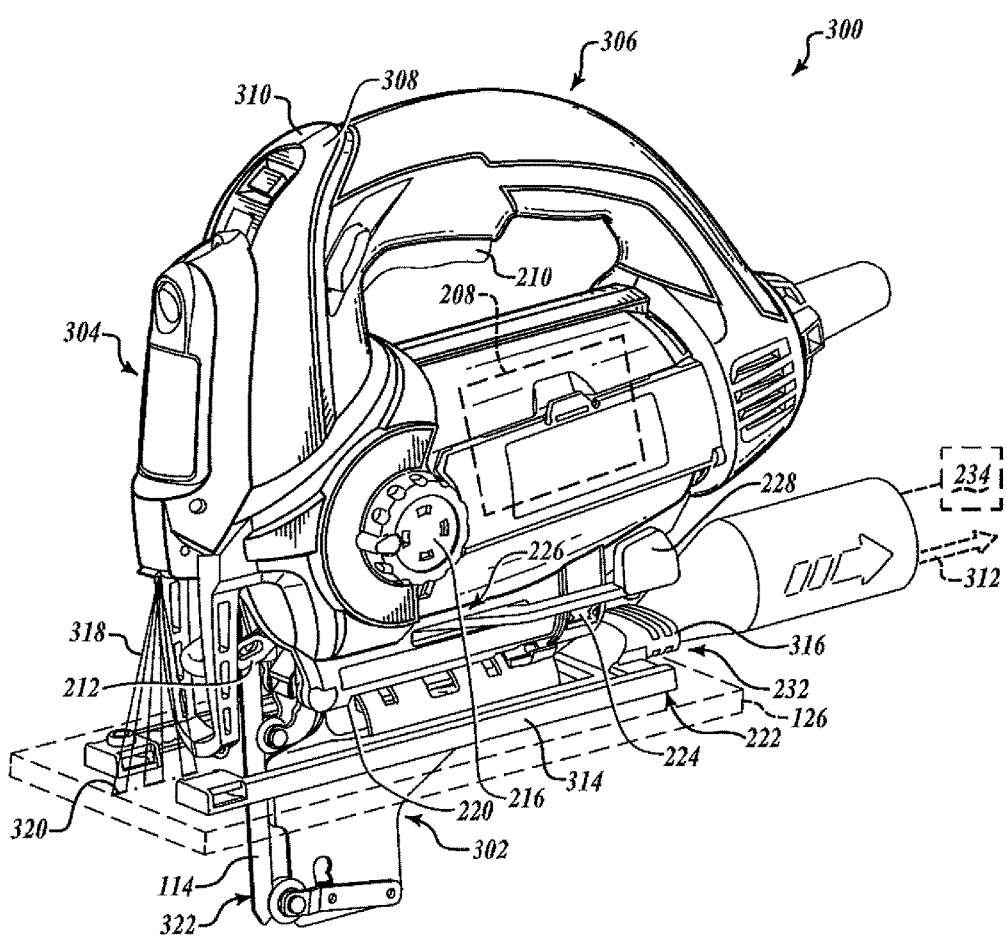
FIG. 3 is a perspective view of a further example of a jigsaw similar to the jigsaw of FIG. 2 and includes a laser light module connected to a front of the housing and a keel assembly connected to a bottom of the housing in accordance with the present teachings.

With reference to FIG. 3, a jigsaw 300 can be similar to the exemplary jigsaw 200 (FIG. 2) and can also include a keel assembly 302 and/or a laser module 304 that can be connected to a housing 306 having two housing half shells 308, 310 implemented in a similar fashion to the jigsaw 200. The jigsaw 300 can further include a dust extraction airflow 312 through a shoe member 314. The dust extraction airflow 312 can exit from a dust extraction port 316 that can extend therefrom. The laser module 304 can project a laser light 318 and can produce a laser light pattern 320. The laser light pattern 320 can produce, for example, a sequence of dashes and/or dots beyond a front side 322 of the cutting blade 114 and can highlight a path of the cutting blade 114 through the workpiece 126.

The keel assembly 302 can provide additional straight-line accuracy when cutting a straight line in the workpiece 126 (e.g., it can help avoid wandering of the jigsaw cutting line). The keel assembly 302 can be pivoted with the housing 306 when the shoe member 314 is moved at an angle (i.e., one or more cutting angles 116 (FIG. 6)) relative to the housing 306. In this regard, the shoe member 314 can be pivoted relative to the housing 306 but the keel assembly 302 can remain generally in line with the housing 306 so as to provide, for example, a straight bevel cut through the workpiece 126.

Figure 4:
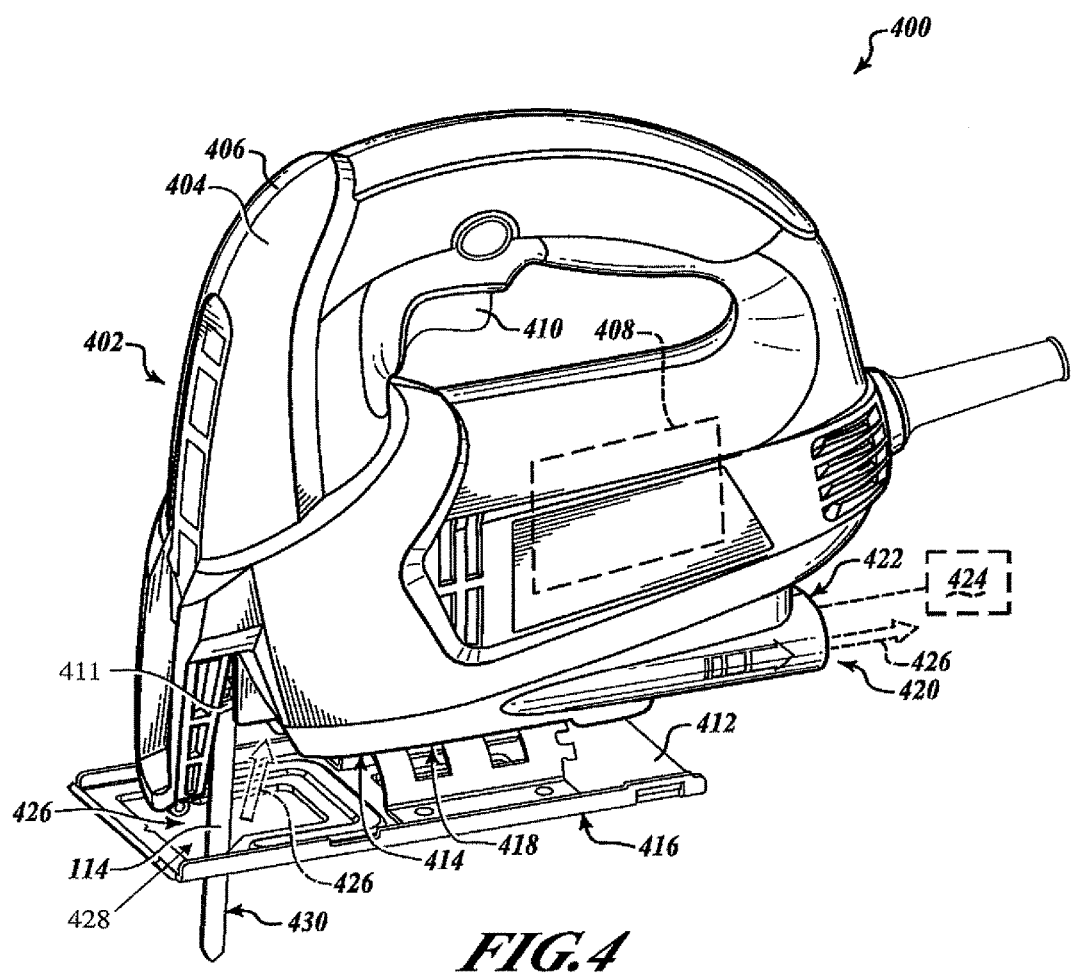
FIG. 4 is a perspective view of yet another example of a jigsaw having a shoe member that can be secured at a zero degree cutting angle (i.e., a perpendicular cutting angle) by moving the shoe member in an axial direction relative to the housing in accordance with the present teachings.

With reference to FIG. 4, a jigsaw 400 includes a housing 402 that can be formed of two half shells 404, 406. The housing 402 can contain a motor 408. When activated by a trigger assembly 410, the motor 408 can provide a reciprocating and/or pendulum motion to a cutting blade holder 411 on an end of a reciprocating shaft to drive the cutting blade 114 at one of the cutting angles 116 (FIG. 6).

A shoe member 412 can be coupled to a bottom 414 of the housing 402 in such a way as to permit the shoe member 412 to pivot relative to the housing 402. As the shoe member 412 pivots relative to the housing 402, the cutting blade 114, can be orientated at various angles (i.e., one or more of the cutting angles 116 (FIG. 6)) relative to the shoe member 412. As is known in the art, a bottom surface 416 of the shoe member 412 can abut the workpiece 126 (FIG. 1).

A locking mechanism 418 can be adjusted between an unlocked condition that can permit the shoe member 412 to pivot relative to the housing 402 and a locked condition that can prevent the shoe member 412 from pivoting relative to the housing 402. In one example, the locking mechanism 418 can include one or more fasteners (not shown) that can secure the shoe member 412 to the bottom 414 of the housing 402. The fasteners can be partially removed to permit the shoe member 412 to pivot relative to the housing 402.

A dust extraction port 420 can be formed on a rear portion 422 of the housing 402 such that a vacuum source 424 can be connected to the dust extraction port 420. A dust extraction airflow 426 can be extracted from a cutting area 428. From the cutting area 428, the dust extraction airflow 426 can move into the housing 402 near a rear side 430 of a cutting blade 114, through the housing 402 and out through the dust extraction port 420.

Figure 5:
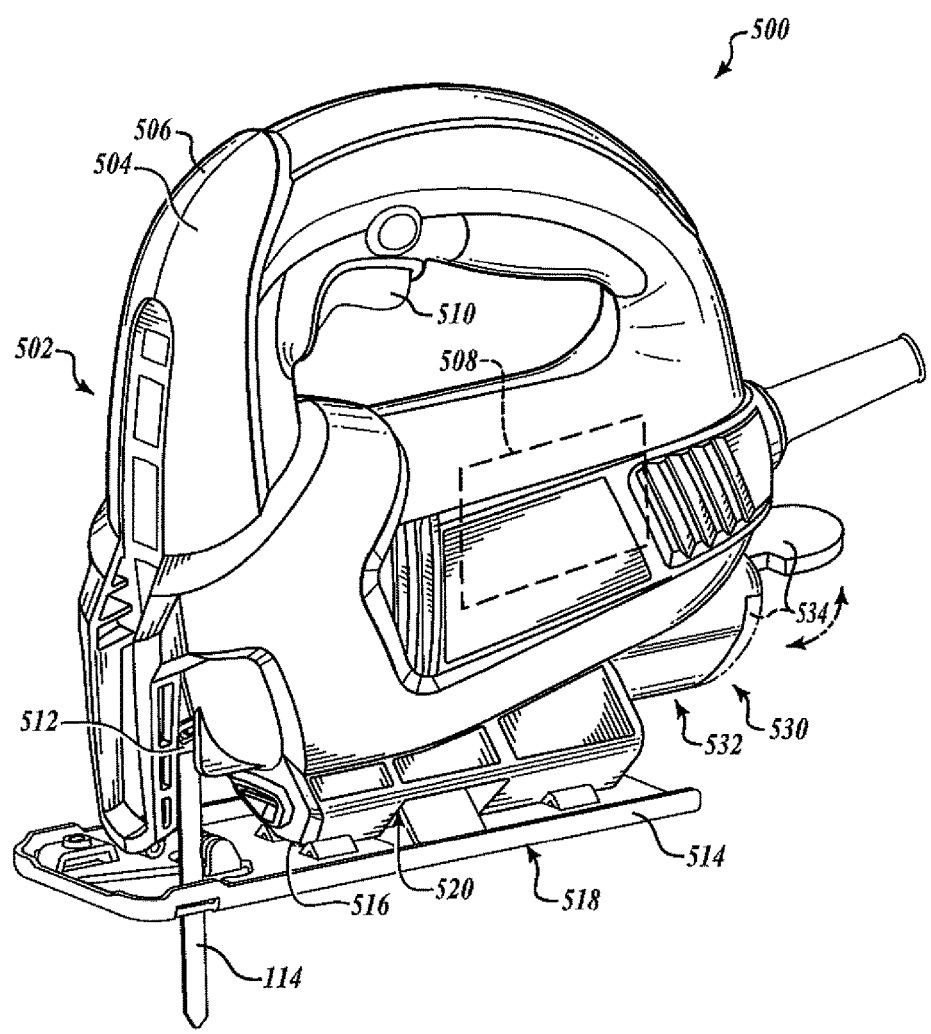
FIG. 5 is a perspective view of a further example of a jigsaw having a shoe member that can be secured at the zero degree cutting angle in accordance with the present teachings.

With reference to FIG. 5, a jigsaw 500 generally includes a housing 502 that can be formed of two half shells 504, 506. The housing 502 can contain a motor 508. When activated by a trigger assembly 510, the motor 508 can provide a reciprocating and/or pendulum motion to a cutting blade holder 512 on an end of a reciprocating shaft to drive a cutting blade 114 at one or more of the cutting angles 116 (FIG. 6).

A shoe member 514 can be coupled to a bottom 516 of the housing 502 in such a way as to permit the shoe member 514 to pivot relative to the housing 502 in a fashion that is similar to the jigsaw 400 (FIG. 4). A bottom surface 518 of the shoe member 514 can abut the workpiece 126 (FIG. 1). In addition, a locking mechanism 520 can be adjusted between an unlocked condition that can permit the shoe member 514 to pivot relative to the housing 502 and a locked condition that can prevent the shoe member 514 from pivoting relative to the housing 502. The locking mechanism 520 can include one or more fasteners (not shown) that can secure the shoe member 514 to the bottom 516 of the housing 502. The fasteners can be partially removed (i.e., the unlocked condition) to permit the shoe member 514 to pivot relative to the housing 502.

A storage container 530 can be formed on a rear portion 532 of the housing 502 such that blades, tools, etc. can be stored within the storage container 530. A storage container cover 534, illustrated in an open condition, can be closed (shown in phantom line) to contain whatever may be placed within the storage container 530.

With reference to FIG. 6, the cutting angle 116 of the cutting blade 114 of the jigsaw 300 is shown relative to the shoe member 314 of the jigsaw 300. The keel assembly 302 is also attached to the housing 306. The cutting angle 116 (illustrated in solid line) is positioned at the zero degree cutting angle, i.e., a perpendicular cutting angle relative to the shoe member 314. The cutting angle 116 can also be positioned at one or more cutting angles such as a cutting angle 352 (shown in phantom line) that can be positioned at about positive fifteen degrees, while a cutting angle 354 (shown in phantom line) can be positioned at about negative thirty degrees. A cutting angle 356 (shown in phantom line) can be positioned at about positive forty five degrees. It will be appreciated in light of the disclosure that various cutting angles can be implemented with any of the jigsaws 100, 200, 300, 400, 500 (FIGS. 1-5).

Figure 19:
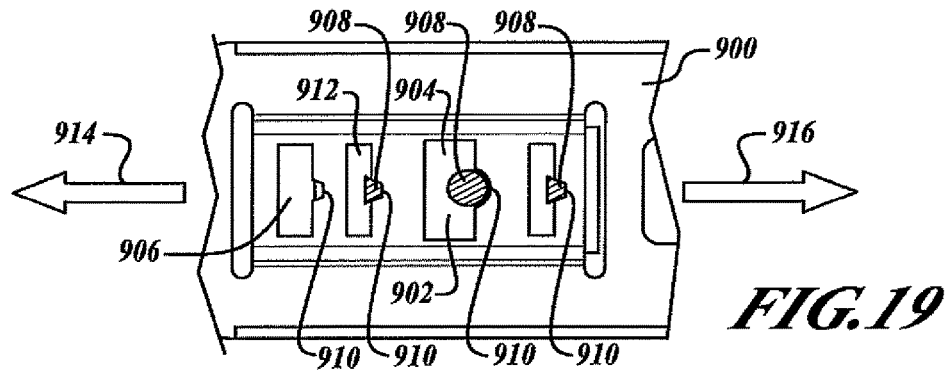
FIG. 19 is a partial bottom view of a shoe member pivotally coupled to the housing having stop members that include a wedge shape in accordance with the present teachings.
Figure 20:
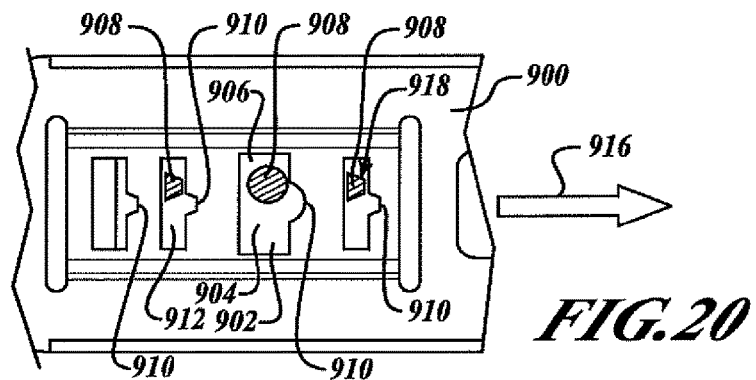
FIG. 20 is similar to FIG. 19 and shows the shoe assembly positioned at an angle other than the zero degree cutting angle (i.e., not at a perpendicular cutting angle) so that the stop members are not contained within complementary pockets formed in the channels of the shoe member in accordance with the present teachings.
Figure 21:
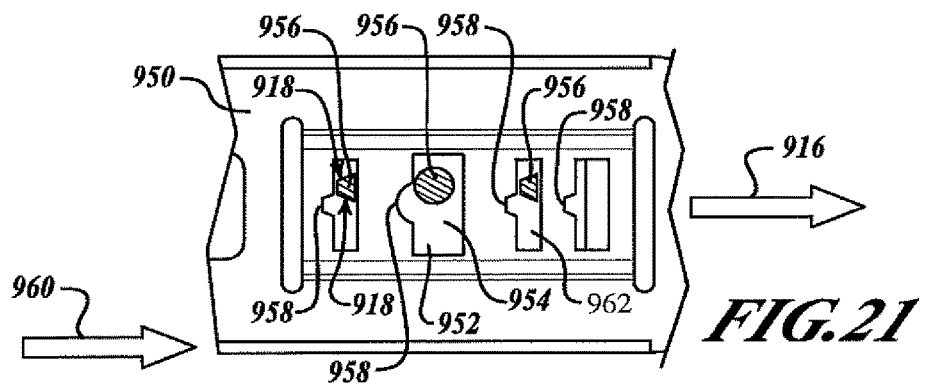
FIG. 21 is similar to FIG. 20 and shows the shoe assembly positioned at an angle other than the zero degree cutting angle so that the stop members are not contained within the complementary pockets formed in the channels of the shoe member. But in this example, the shoe member is engaged to the stop members in an axial direction opposite that of FIG. 20 in accordance with the present teachings.

With reference to FIGS. 1-5, it will be appreciated in light of the disclosure that any of the jigsaws 100, 200, 300, 400, 500 can be adjusted to provide one or more of the cutting angles 116 with or without the keel assembly 302 attached thereto. Moreover, the shoe member 120, 218, 314, 416, 516 can be positively locked to the housing 102, 202, 306, 402, 502, in addition to positioning the locking mechanism 130, 226, 422, 522 in the locked condition when the shoe member 120, 218, 314, 416, 516 is in the zero degree angular position or at other predetermined angular positions. In this regard, the shoe member 120, 218, 314, 416, 516 can be moved axially relative to a cutting direction of the jigsaw 100, 200, 300, 400, 500, to further lock the shoe member 120, 218, 314, 416, 516 to the housing. With reference to FIGS. 19 and 20, a shoe member 900 can be moved in a direction 914 that is axially backward relative to a cutting direction of the jigsaw. With reference to FIG. 21, a shoe member 950 can be moved in a direction 960 that is axially forward or in line with a cutting direction of the jigsaw, as is discussed below.

Figure 7:
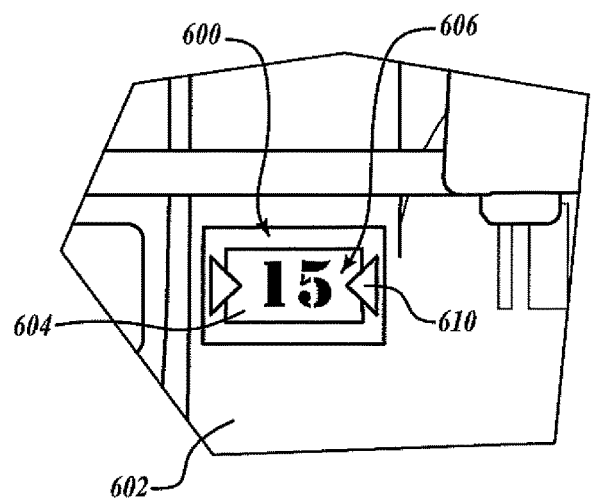
FIG. 7 is a partial side view of the jigsaw housing of FIG. 1 showing the window through which a portion of the angle indicator wheel can be seen to indicate the angle between the jigsaw housing and the shoe member in accordance with the present teachings.

With reference to FIG. 7, a window 600 can be formed in a housing 602 through which a portion of an angle indicator wheel 604 can be displayed. Numbers 606 can be affixed to the angle indicator wheel 604 such that certain numbers 606 can be displayed in the window 600 to indicate a specific angular position of the shoe member 120, 218, 314 (FIGS.

1-3) relative to the workpiece 126 (FIG. 1). It will be appreciated in light of the disclosure that the numbers 606 are but one example of the information that can be displayed through the window 600. Other icons, graphics, symbols, specific indicia and/or one or more combinations thereof can be used and, as such, can be descriptive of angular increments between zero degrees and forty five degrees. For example, a line 608 (FIG. 8) can be aligned with the numbers 606.

The window 600 in the housing 602 can further contain arrows 610 and/or one or more other suitable additional indicators that can provide for a relatively more precise alignment of the angle indicator wheel 604 in the window 600 and thus at a desired cutting angle. In this regard, the user can more readily identify the exact position of the shoe member 120, 218, 314 based on the position of the numbers 606 and/or other graphics, icons, etc. in the window 600 relative to the arrows 610 formed around the window 600. It will be appreciated in light of the disclosure that the window 600, as described above, can be implemented on any of the jigsaws 100, the jigsaw 200 and/or the jigsaw 300.

Figure 8:
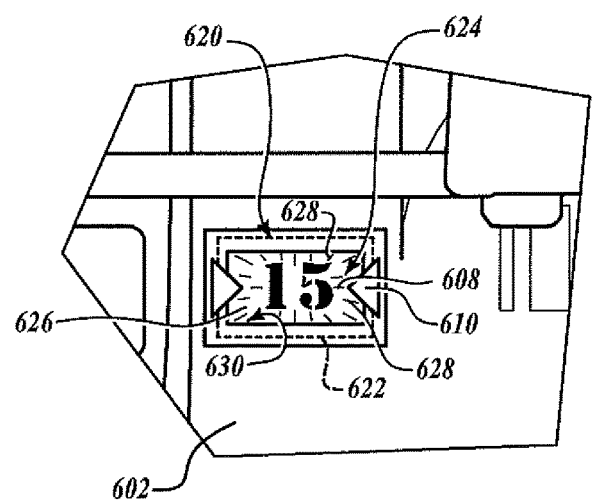
FIG. 8 is similar to FIG. 7 and shows a perimeter of the window illuminating the information on the angle indicator wheel in accordance with the present teachings.

In one example and with reference to FIG. 8, a window 620 can include a perimeter illumination mechanism 622 that can illuminate numbers 624 on an angle indicator wheel 626 to more readily view the numbers 624. The perimeter illumination mechanism 622 that can emanate light 628 from the entire inner periphery 630 of the window 620 or portions thereof. The perimeter illumination mechanism 622 can include one or more light emitting diodes of one or various colors, one or more small incandescent bulbs and/or one or more combinations thereof to provide suitable illumination to the angle indicator wheel 626.

Figure 9:
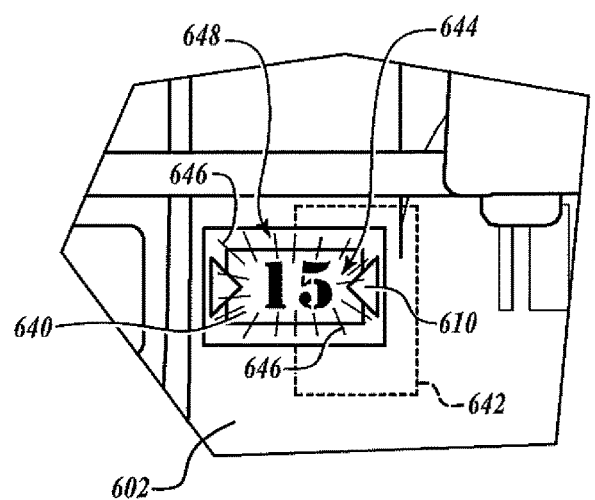
FIG. 9 is similar to FIG. 7 and shows a portion of the angle indicator wheel illuminated and shining through the window in accordance with the present teachings.

With reference to FIG. 9, an angle indicator wheel 640 can contain within the angle indicator wheel 640 (or adjacent thereto), an illumination source 642 that can shine through the angle indicator wheel 640 and illuminate numbers 644 thereon. By illuminating the angle indicator wheel 640, portions of the angle indicator wheel 640 can glow (i.e., emit light 646) as viewed through a window 648. The glowing angle indicator wheel 640 can be shown to more readily highlight the numbers 644 on the angle indicator wheel 640. It will be appreciated in light of the present disclosure that the window 600, the window 620 or the window 648 can be implemented on the jigsaw 100, the jigsaw 200 and the jigsaw 300.

With reference to FIG. 10, a dust extraction airflow 700 can be directed through an airflow pathway 702 that can be established by an exemplary housing 704 of a jigsaw 706. In one example, a portion of the airflow pathway 702 can be through the angle indicator wheel 708, which can be similar to the angle indicator wheel 128 (FIG. 1). The dust extraction airflow 700 can begin at a rear edge 710 of the cutting blade 114. The dust extraction airflow 700 can continue up into the airflow pathway 702 that can be provided by multiple ribs 712 formed in the housing 704.

The dust extraction airflow 700 can continue through the airflow pathway 702 that can continue through the housing 704, above a shoe block member 714 toward a rear portion 716 of the housing 704. The dust extraction airflow 700 can turn downward through the airflow pathway 702 toward a shoe member 718 and can be directed through the inner periphery 720 of the angle indicator wheel 708 so as to define a portion of the airflow pathway 702 therethrough. The dust extraction airflow 700 can move through the angle indicator wheel 708 and out through a dust extraction port 722 formed in the rear portion 716 of the housing 704.

A vacuum source 724 can attach to the dust extraction port 722 formed in the housing 704 to establish the dust extraction airflow 700 through the airflow pathway 702 from the rear edge 710 of the cutting blade 114 out through the dust extraction port 722. Similar to what is shown in FIG. 6, the shoe member 718 can be moved relative to the housing 704 and can establish and maintain the dust extraction airflow 700 through the airflow pathway 702 in any of the cutting angles 116 (FIG. 6).

In one example, an adapter member 726 can connect the dust extraction port 722 to the vacuum source 724. The adapter member 726 can be configured as a component that can releaseably couple to the dust extraction port 722 and/or the vacuum source 724 or can be integral or fixedly coupled to the dust extraction port 722 and/or the vacuum source 724.

With reference to FIG. 11, a dust extraction airflow 750 can be directed through an airflow pathway 752 formed in an exemplary housing 754 of a jigsaw 756. It will be appreciated in light of the disclosure that the dust extraction airflow 750 through the airflow pathway 752 can be implemented on the jigsaw 100 (FIG. 1). In this regard, a portion (or all) of the dust extraction airflow 750 can be directed through the angle indicator wheel 758, which can be similar to the angle indicator wheel 128 (FIG. 1).

In one example, the dust extraction airflow 750 can begin at a rear edge 760 of the cutting blade 114. The dust extraction airflow 750 can continue up through the air scoop member 762 and into multiple ribs 764 formed in the housing 754 that can establish the airflow pathway 752. The airflow pathway 752 can continue through the housing 754, above a shoe block member 766 toward a rear portion 768 of the housing 754. The dust extraction airflow 750 in the airflow pathway 752 can turn downward toward a shoe member 770 and can be directed through the inner periphery 772 of the angle indicator wheel 758. The airflow pathway 752 can move through the angle indicator wheel 758 and out through a dust extraction port 774 formed in the rear portion 768 of the housing 754.

A vacuum source 776 can attach to the dust extraction port 774 formed in the housing 754 to establish the dust extraction airflow 750 from the rear edge 760 of the cutting blade 114 out through the dust extraction port 774. Similar to what is shown in FIG. 6, the shoe member 770 can be moved relative to the housing 754 that can establish the airflow pathway 752 in any of the cutting angles 116 (FIG. 6).

It will be appreciated in light of the disclosure that the vacuum source 138, 234, 428, 528, 724, 776 can be one or more of a canister vacuum, central vacuum system, dust collection system or the like. In one example, an adapter member 778 can connect the dust extraction port 774 to the vacuum source 776. The adapter member 778 can be configured as a component that can releaseably couple to the dust extraction port 774 and/or the vacuum source 776 or can be integral or fixedly coupled to the dust extraction port 774 and/or the vacuum source 776.

With reference to FIG. 12, the scoop member 148 can be positioned behind an upper carrier assembly 150 that is configured to support the cutting blade 114. Behind the scoop member 148, the shoe member 120 can be secured to the bottom 122 of the housing 102. The scoop member 148 can establish a front lip 152 that can extend toward the cutting area 142. From the front lip 152, two arcuate side wall members 154 can extend upward toward the housing 102.

In one example, the arcuate side wall members 154 and the front lip 152 can be configured as a component that can releaseably couple to the housing 102 or can be integral or fixedly coupled to the housing 102. The dust extraction airflow 140 can enter through the scoop member 148 and travel from the scoop member 148 through the housing 102 (e.g., through the airflow pathway 752 in FIG. 11) to be exhausted from the dust extraction port 134 (FIG. 1).

Figure 13:
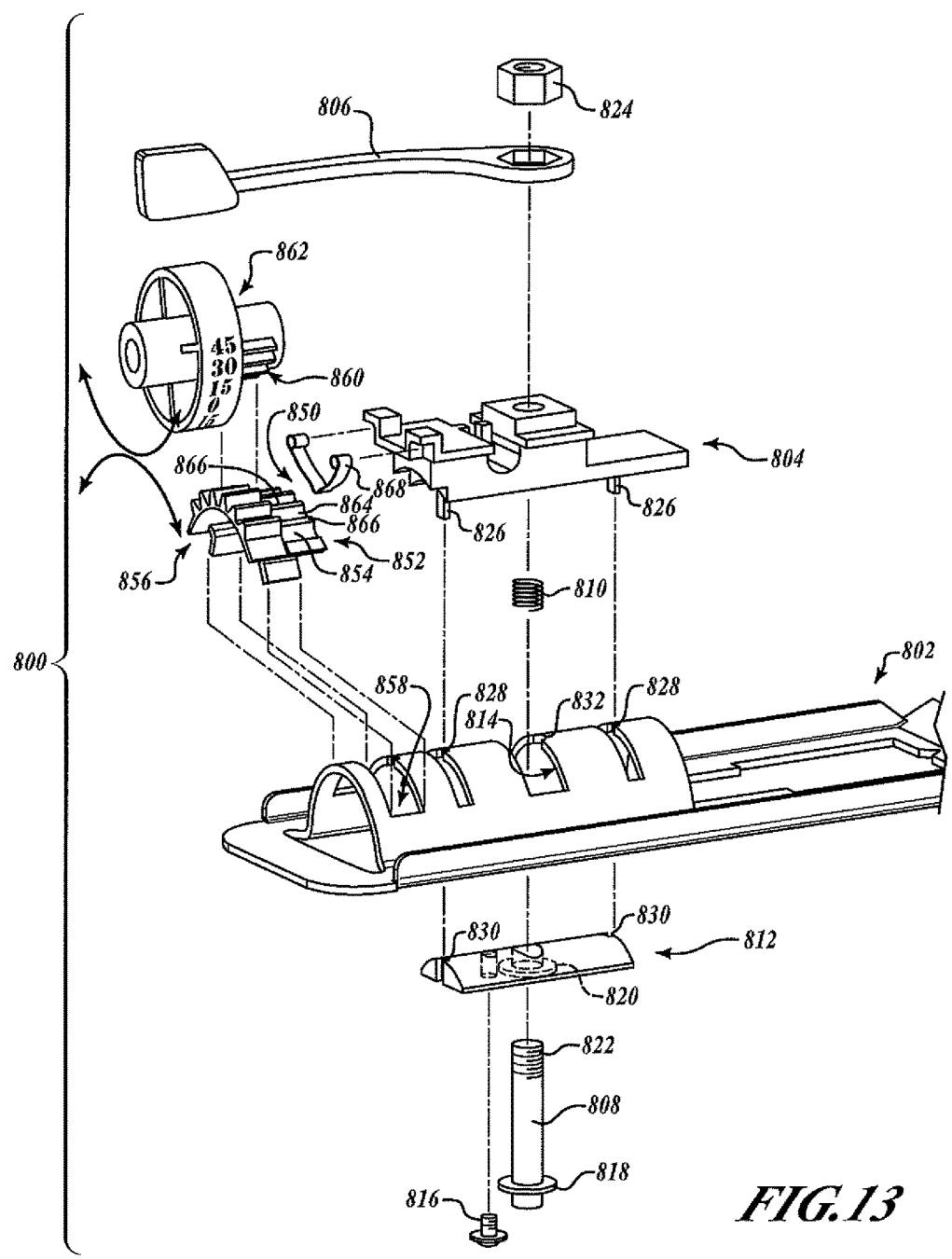
FIG. 13 is an exploded assembly view of an exemplary shoe subassembly that can be implemented with the jigsaws illustrated in FIGS. 1, 2 and/or 3 in accordance with the present teachings.
Figure 14:
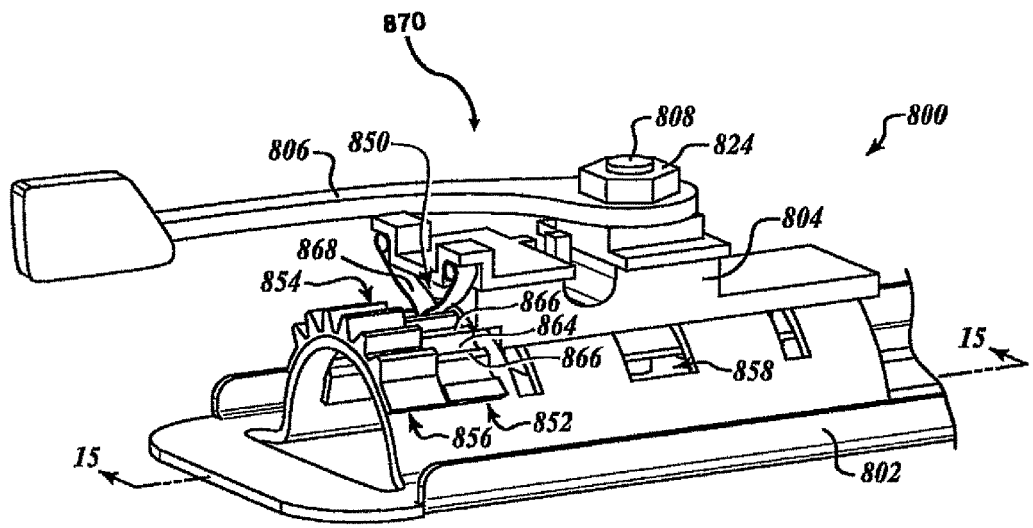
FIG. 14 is a perspective view of the shoe subassembly of FIG. 13 showing a locking mechanism having a bevel lock arm and a shoe insert coupled to a channel formed in the shoe member in accordance with the present teachings.
Figure 15:
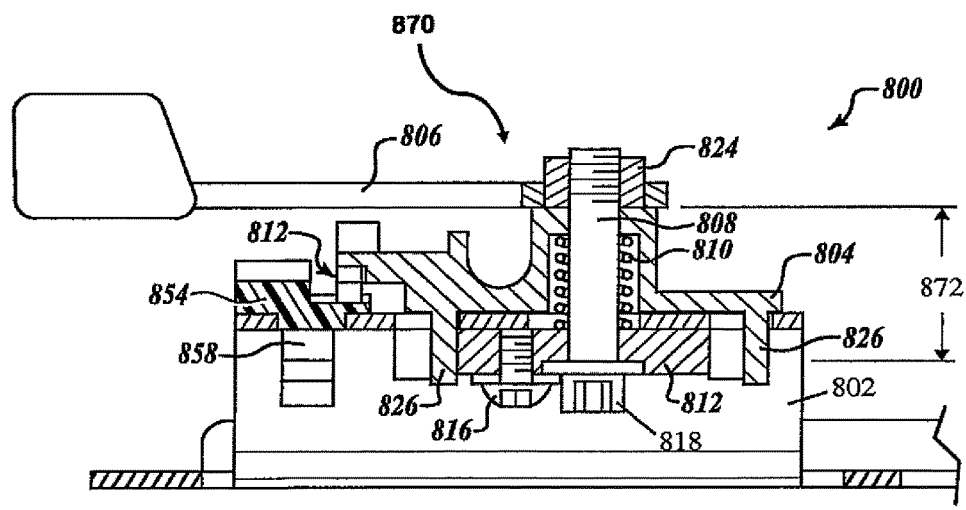
FIG. 15 is a simplified cross-sectional view of the shoe subassembly illustrated in FIG. 14 in accordance with the present teachings.

With reference to FIGS. 13, 14 and 15, a shoe subassembly 800 includes a shoe member 802, a shoe block member 804 and a bevel lever 806. The bevel lever 806 can be attached to the shoe block member 804 with a fastener 808 that can include a spring 810 to provide tension to the bevel lever 806, especially in the locked condition. In one example, the spring 810 can be omitted.

A clamp member 812 can be connected to a bottom surface 814 of the shoe member 802 with a fastener 816. In another example, the clamp member 812 can be configured as a component that can releaseably couple to the shoe member 802 or can be integral or fixedly coupled to the shoe member 802. A head 818 of the fastener 808 can be received in an aperture 820 formed in the clamp member 812. A threaded end 822 of the fastener 808 can be received by a threaded member 824 that can be fixed to the bevel lever 806.

Posts 826 that each can extend from the shoe block member 804 can extend through grooves 828 formed on the shoe member 802 and grooves 830 on the clamp member 812. The fastener 808 can also pass through a groove 832 formed on the shoe member 802. The groove 828, the groove 830 and/or the groove 832 can be used to align the shoe member 802, the shoe block member 804 and the clamp member 812. The threaded member 824 can be configured to be fixed coupled to or integral with the bevel lever 806.

Similar to the bevel lever 132 in FIG. 1, the bevel lever 806 can be moved between the locked condition and the unlocked condition. When moving from the unlocked condition to the locked condition, the bevel lever 806 moves the threaded member 824 to draw the fastener 808 upward (i.e., toward the top of the page in FIG. 15). By drawing the fastener 808 upward, a clamping force between the clamp member 812 and the shoe block member 804 on the shoe member 802 can be increased. In the locked condition, the clamping force between the clamp member 812 and the shoe block member 804 is sufficient to prevent the pivoting of the shoe member 802. As the bevel lever 806 is moved from the unlocked condition to the locked condition, the movement of the threaded member 824 with the bevel lever 806 can push the fastener 808 downward. By pushing the fastener 808 downward, the clamping force can be sufficiently reduced to a value such that the shoe member 802 can pivot relative to the shoe block member 804 and ultimately a housing of a jigsaw to which the shoe block member 804 can be attached, e.g., the jigsaw 100 (FIG. 1).

With reference to FIG. 14, an interaction member 850 can secure to and can extend from the shoe block member 804. The interaction member 850 can contact a first row of partial gear teeth 852 formed on a shoe insert 854 that can be coupled to the shoe member 802. The first row of partial gear teeth 852 can be adjacent a second row of partial gear teeth 856. The shoe insert 854 can be formed of a flexible material so as to permit the bending of the shoe insert 854 into a curved channel 858 (FIG. 13) formed in the shoe member 802.

The first row of partial gear teeth 852 can selectively contact the interaction member 850 that extends from the shoe block member 804. The second row of partial gear teeth 856 can mesh with partial gear teeth 860 formed on an angle indicator wheel 862 (FIG. 13). In one example, one or more intermediate gears (whole or partial) can be disposed between a shoe member and an indicator wheel so that pivoting the shoe member relative to a jigsaw housing can rotate the one or more intermediate gears and the indicator wheel.

The interaction member 850 that extends from the shoe block member 804 can provide a momentary positive lock between the shoe block member 804 and the shoe member 802 via engagement between the interaction member 850 and the first row of partial gear teeth 852. As the shoe member 802 is pivoted relative to the shoe block member 804, the interaction member 850 can deflect and jump from each of the pockets 864 formed between gear teeth 866 in the first row of partial gear teeth 852.

In one example, the interaction member 850 can be a leaf spring 868 that can connect to the shoe block member 804. The deflection of the leaf spring 868, as a portion of the leaf spring 868 jumps between the pockets 864 formed between the gear teeth 866, can provide an audible click. The audible click can be an indicator to a user that the shoe member 802 has pivoted to the next angular detent, e.g., a move from the fifteen degree cutting angle 352 (FIG. 6) to a thirty degree cutting angle. In a further example, a spring biased member, such as a ball, post, etc., can similarly interact with the pocket 864 of the gear teeth 866. The spring biased member can be coupled to the shoe block member 804 and extend toward the shoe insert 854.

The shoe subassembly 800 can be assembled, as illustrated in FIG. 14, prior to fully assembling the jigsaw, which, for example, can be the jigsaw 100, 200, 300 (FIGS. 1, 2 and 3). In addition, a locking mechanism 870 (FIG. 14) can be configured so that the shoe clamping force for the locking mechanism 130, 226, 870 (FIGS. 1, 2 and 15) can be set and configured prior to assembling the shoe subassembly 800 with the jigsaw housings 102, 202, 302. In one example, the shoe clamping force can be set so that a range of shoe clamping force values is selectively available to the user, as the user manipulates the locking mechanism 130, 226, 870 (FIGS. 1, 2 and 15) between the locked and unlocked conditions. The range of clamping force values can be set, thus predetermined, by selecting a distance from the head 818 of the fastener 808 and the threaded member 824 on the bevel lever 806. It will be appreciated in light of the disclosure that the shoe subassembly 800 can be assembled, the clamping force can be set and the shoe subassembly 800 can be shipped from a location other than in a location where the jigsaw is assembled.

Figure 16:
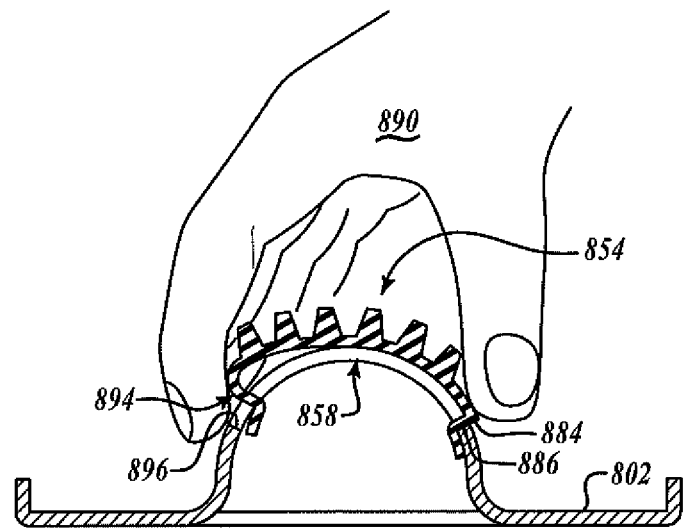
FIG. 16 is a diagram of a partial cross-sectional view of the shoe insert and the shoe member with a user flexing the shoe insert into a channel formed in the shoe member in accordance with the present teachings.

With reference to FIG. 16, the shoe insert 854 having the two rows of partial gear teeth 852, 856 (FIG. 14) can be assembled into the shoe member 802, which can be separately manufactured from the shoe insert 854. The shoe insert 854, as a separate component, can include the relatively complex structure detailed geometry of the first and second partial rows of gear teeth 852, 856. The fabrication of such relatively complex structures, in certain instances, is not required when fabricating the shoe member 802.

Figure 17:
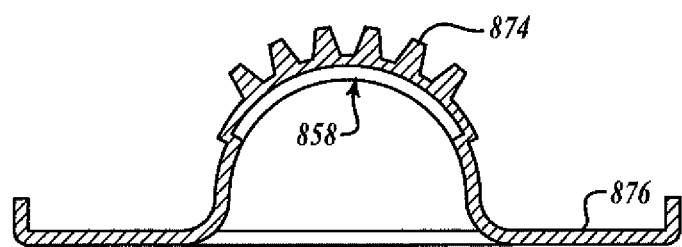
FIG. 17 is similar to FIG. 16 and shows the shoe insert and the shoe member being a monolithic member in accordance with the present teachings.

With reference to FIG. 17, a shoe insert 874 having the two rows of partial gear teeth 852, 856 (FIG. 14) can be produced with a shoe member 876 that can be monolithically manufactured together with the shoe insert 874. In one example, the shoe insert 874 and the shoe member 876 are all one piece of metal. While in another example, the shoe insert 854 can be manufactured separately but can be cast in place or mechanically or chemically fastened to the shoe member 876. In the above examples, the shoe insert 874 need not be flexible.

Figure 18:
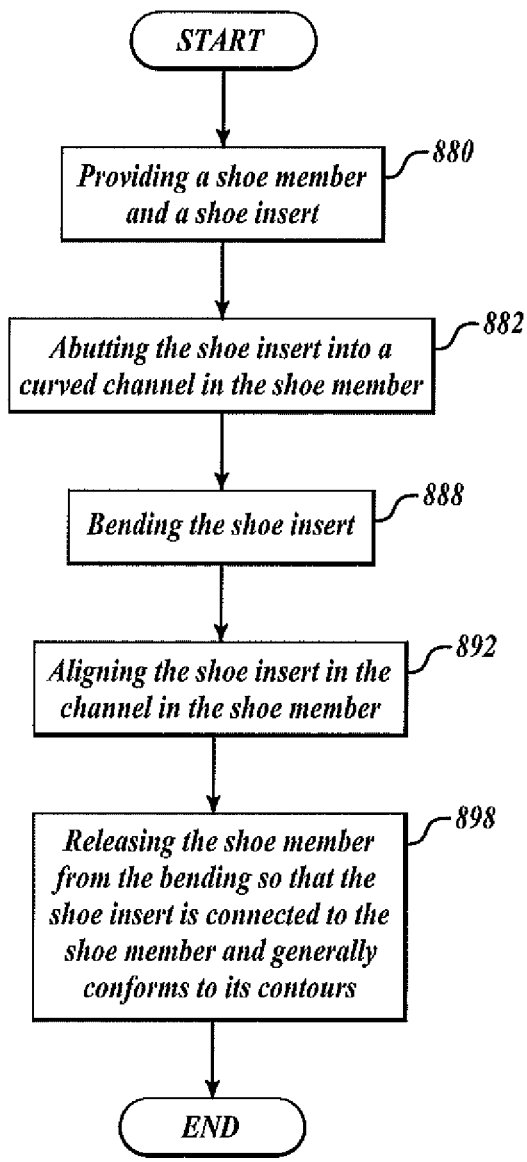
FIG. 18 is a flowchart of an exemplary method of assembling a shoe insert into a shoe member in accordance with the present teachings.

With reference to FIG. 18, a flowchart method of inserting the shoe insert 854 (FIG. 16) into the shoe member 802 (FIG. 16) generally includes, at 880, providing a shoe member 802 that defines a curved channel 858 (FIG. 13) and providing a shoe insert 854 configured to be accepted by the curved channel 858. At 882, a first end 884 (FIG. 16) of the shoe insert 854 can abut a first end 886 (FIG. 16) of the curved channel 858. At 888, at least a portion of the shoe insert 854 can be bent, flexed or otherwise distorted by a user 890 (FIG. 16). At 892, a second end 894 (FIG. 16) of the shoe insert 854 can be aligned with a second end 896 (FIG. 16) of the curve channel 858. At 898, the shoe insert 854 can be released from the bending or flexing at 888. After 898, the method can end.

With reference to FIGS. 19 and 20, the exemplary shoe member 900 is shown with portions of a housing 902 (and in some examples a shoe block member 904) visible through the shoe member 900. As such, a bottom 906 of the housing 902 can define stop members 908 that can interact with a complementary pocket 910 formed in channels 912 in the shoe member 900. In an example where the shoe block member 904 is implemented, the shoe block member 904 can connect to the housing 902 and the stop members 908 can extend from the shoe block member 904.

In one example, one or more of the stop members 908 can have a wedge shape and the pockets 910 can have a complementary wedge shape. In a further example, the stop members 908 can have a circular shape and the pockets 910 can have a complementary circular shape. When the shoe member 900 is positioned at a zero degree angular position (i.e., a perpendicular cutting angle), the shoe member 900 can be advanced in a direction 914 that can be axially backward relative to a cutting direction 916 (i.e., toward the right side of the page in FIG. 19) to engage the stop members 908 that extend from the housing 902. In this regard, the stop members 908 can move into complimentary pockets 910 and can provide a positive engagement at zero degrees.

Because of the wedge shape of the stop members 908, the complementary pockets 910 can be axially advanced onto the wedge shaped stop members 908. When there is any slack (i.e., gaps) in the contact between the stop members 908 and the complementary pockets 910, additionally advancing the shoe member 900 so that the complementary pockets 910 receive more and more of the wedge shaped stop members 908, can further close any gaps relative to a configuration of stop members not having the wedge shape but having parallel sides. In contrast, the stop members 908 having the wedge shape, can define walls 918 (FIG. 20) that converge toward the cutting direction 916 of the jigsaw, i.e., toward the left in FIG. 1.

By taking up the other tolerances in the shoe subassembly 800 (FIG. 14), other tolerances in the shoe subassembly 800 do not need to be held as tight as would otherwise be without the wedge shaped stop members 908 that extend from the housing 902 or shoe block member 804. It will be appreciated in light of the disclosure that the shoe member 900 and the above described shoe sub-assembly 800 can be implemented on any of the jigsaws 100, 200, 300, 400, 500, above.

With reference to FIG. 20, the shoe member 900 is shown in a position other than zero degrees (e.g., the cutting angle 354 (FIG. 6)). In this instance, the wedge shaped stop members 908 cannot be received within the wedge shaped pockets 910 formed in the shoe member 900 but advance along the channels 912 that contain pockets 910 as the shoe member pivots relative the housing 902. It will be appreciated in light of the disclosure that stop members 908 can extend from the housing 902 (or the shoe block member 904) at other angular positions (i.e., not at zero degrees) so that the shoe member 900 can be axially moved relative to housing 902 to provide positive engagement at one or more cutting angles. For example, stop members can be provided for positive engagement of the shoe member 900 at zero degrees and at forty-five degrees. In other examples, stop members can be provided for positive engagement of the shoe member 900 at only forty-five degrees.

With reference to FIG. 21, another example shoe member 950 is shown with portions of a housing 952 (or a shoe block member 954) visible through the shoe member 950. As such, a bottom of the housing 952 can define stop members 956 that can interact with complimentary pockets 958 formed in channels 962 in the shoe member 950. The shape of the stop members 956 and/or the pockets 958 can be similar to the stop members 908 and complimentary pockets 910 illustrated in FIGS. 19 and 20. The shoe member 950, however, can be positioned at a zero degree angular position and can be advanced in a direction 960 that can be axially forward relative to (i.e., in line with) the cutting direction 916 to engage the stop members 956 that extend from the housing 952. In this regard, the motion of the shoe member 950 can be similar to that of the shoe member 902 and FIG. 19, but can be moved in direction 960, in contrast to direction 914 (FIG. 19).

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. A jigsaw comprising:
    a housing containing a motor activated by a trigger assembly, said housing defining a window;
    a shoe member pivotally connected to said housing; and
    an indicator wheel disposed in said housing so that a portion of said indicator wheel is visible through said window, said indicator wheel operably connected to said shoe member such that pivoting of said shoe member relative to said housing causes said indicator wheel to rotate.

2. The jigsaw of claim 1, wherein said shoe member defines an angle relative to said housing and said portion of said indicator wheel visible through said window is descriptive of said angle.

3. The jigsaw of claim 1, further comprising gear teeth that extend from said shoe member and mesh with gear teeth that extend from said indicator wheel.

4. The jigsaw of claim 1, wherein said indicator wheel includes information descriptive of angular increments between about zero degrees and about forty five degrees, said information visible through said window.

5. The jigsaw of claim 1, wherein said housing defines an airflow pathway through which a dust extraction airflow passes capable of clearing debris from a cutting area and wherein said airflow pathway is disposed through an inner periphery of said indicator wheel.

6. The jigsaw of claim 5, wherein said angle indicator wheel is coupled for rotation on a portion of said housing through which said airflow pathway passes.

7. The jigsaw of claim 5, further comprising a scoop member that extends from said housing and toward said cutting area, wherein said scoop member defines a portion of said airflow pathway through which said dust extraction airflow passes from said cutting area and through said housing.

8. The jigsaw of claim 1, wherein the pivotal connection of said shoe member to said housing includes structure that produces an audible click as said shoe member moves through each angular increment in a range of angular increments relative to said housing.

9. The jigsaw of claim 1, further comprising an illumination mechanism that illuminates said portion of said indicator wheel visible through said window.

10. The jigsaw of claim 1, further comprising a locking mechanism operably connected to said housing and to said shoe member, said locking mechanism having an unlocked condition that permits said shoe member to pivot relative to said housing and a locked condition that prevents said shoe member from pivoting relative to said housing.

11. The jigsaw of claim 1, further comprising a stop member that extends from said housing, wherein said shoe member is configured to be moved axially relative to said housing so that a portion of said shoe member engages said stop member to prevent said shoe member from pivoting relative to said housing.

12. A jigsaw comprising:
a housing containing a motor activated by a trigger assembly, said housing defining a window;
a shoe member pivotally connected to said housing;
a locking mechanism connected to said housing and to said shoe member, said locking mechanism having an unlocked condition that permits said shoe member to pivot relative to said housing and a locked condition that prevents said shoe member from pivoting relative to said housing;
an indicator wheel disposed in said housing so that a position of said indicator wheel is visible through said window, said indicator wheel operably connected to said shoe member such that pivoting of said shoe member relative to said housing causes said indicator wheel to rotate; and
an airflow pathway through which a dust extraction airflow is established at any angle at which said shoe member pivots relative to said housing.

13. The jigsaw of claim 12, further comprising an illumination mechanism, wherein a portion of said indicator wheel visible through said window is illuminated by said illumination mechanism.

14. The jigsaw of claim 12, wherein said airflow pathway is disposed through an inner periphery of said indicator wheel.

15. The jigsaw of claim 12, wherein said airflow pathway is through said housing.

16. The jigsaw of claim 15, further comprising a scoop member through which said airflow pathway is disposed.

17. The jigsaw of claim 12, wherein said airflow pathway is through said shoe member.

18. A method of selecting a cutting angle for a jigsaw, the method comprising:
rotating an indicator wheel in a housing of the jigsaw by pivoting a shoe member of the jigsaw about said housing; and
displaying a portion of said indicator wheel in a window in said housing, wherein said portion of said indicator wheel, visible through said window, is descriptive of an angle between said housing and said shoe member.

19. The method of claim 18, further comprising a dust extraction airflow through an airflow pathway, wherein a portion of said airflow pathway is through an inner periphery of said indicator wheel.

20. The method of claim 18, further comprising a dust extraction airflow through an airflow pathway, wherein a portion of said airflow pathway is through said shoe member.

21. A jigsaw comprising:
a housing containing a motor activated by a trigger assembly, said housing defining a window;
a shoe member pivotally connected to said housing and including gear teeth; and
an indicator wheel disposed in said housing so that a portion of said indicator wheel is visible through said window, the indicator wheel including gear teeth that mesh with the gear teeth of the shoe member, wherein pivoting of said shoe member relative to said housing causes said indicator wheel to rotate.

22. The jigsaw of claim 21, wherein said shoe member defines an angle relative to said housing and said portion of said indicator wheel visible through said window is descriptive of said angle.

23. The jigsaw of claim 21, wherein said indicator wheel includes information descriptive of angular increments between about zero degrees and about forty five degrees, said information visible through said window.

24. The jigsaw of claim 21, wherein the pivotal connection of said shoe member to said housing includes structure that produces an audible click as said shoe member moves through each angular increment in a range of angular increments relative to said housing.

25. The jigsaw of claim 21 further comprising an illumination mechanism that illuminates said portion of said indicator wheel visible through said window.

26. The jigsaw of claim 21 further comprising an airflow pathway through which a dust extraction airflow is established at any angle at which said shoe member pivots relative to said housing.

27. The jigsaw of claim 21, wherein the gear teeth of the shoe member are formed on a shoe insert assembled into the shoe member.

28. The jigsaw of claim 27, wherein the shoe member and the shoe insert are monolithically manufactured together.

29. The jigsaw of claim 21 further comprising a locking mechanism operably connected to said housing and to said shoe member, said locking mechanism having an unlocked condition that permits said shoe member to pivot relative to said housing and a locked condition that prevents said shoe member from pivoting relative to said housing.

30. The jigsaw of claim 21 further comprising a stop member that extends from said housing, wherein said shoe member is configured to be moved axially relative to said housing so that a portion of said shoe member engages said stop member to prevent said shoe member from pivoting relative to said housing.

\* \* \* \* \*